Aug. 16, 1966     W. BATTENFELD     3,267,186
METHOD OF APPLYING MEMBERS, AS LABELS, PLATENS, OR THE LIKE
TO HOLLOW BODIES IN A BLOWING PROCESS
Original Filed June 16, 1964
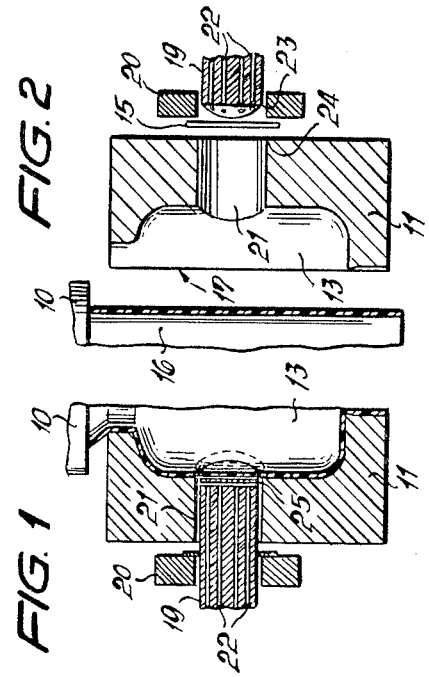
INVENTOR.
Werner Battenfeld
BY Ernest Montague
attorney

… … …

United States Patent Office 3,267,186
Patented August 16, 1966

3,267,186
METHOD OF APPLYING MEMBERS, AS LABELS, PLATENS, OR THE LIKE TO HOLLOW BODIES IN A BLOWING PROCESS
Werner Battenfeld, Meinerzhagen, Westphalia, Germany, assignor to Firma Gebruder Battenfeld, Meinerzhagen, Westphalia, Germany, a corporation of Germany
Original application June 16, 1964, Ser. No. 377,175, now Patent No. 3,227,787, dated Jan. 4, 1966. Divided and this application June 22, 1965, Ser No. 478,782
2 Claims. (Cl. 264—98)

This is a division of patent application Serial No. 377,175, filed June 16, 1964, now Patent No. 3,227,787, which in turn, is a continuation-in-part application to patent application Serial No. 102,581, filed April 12, 1961, now abandoned.

The present invention relates to a method of applying members, as labels, platens, or the like to hollow bodies in a blowing process.

It is known to print on hollow bodies, blown from hoses or bands, after the blowing process. This printing is time-consuming, particularly on bulky parts and especially in case of a multi-color print due to the partly required pre-treatment of the blown hollow bodies, in order to adhere the color properly. Above all, for each configuration of the hollow bodies particular printing machines must be used.

It has been also proposed before to manufacture resinous plastic molded articles by inserting sheet material carrying transferable ink recordations thereon as successive portions of a continuous web between split dies which form when closed a cavity with the ink recordations spread out in a predetermined alignment with respect to a wall of the cavity, then forcing under pressure flowing resinous plastic material in a heated state into the cavity and against the ink recordations for fusing and baking the latter in an unmodified configuration to the resinous plastic molded article prior to and during solidification thereof, and detaching each of the molded articles with a portion of the sheet material adhering thereto from the web. Such process has been found proper in connection with split dies.

On the other hand, in the formation of containers from plastics, thermoplastic polymers formed by blow molding techniques are generally employed. In accordance to the teachings of the prior art, some support had to be provided in an attempt to provide markings directly on the surface of relatively flexible articles of this type. Additional marking problems have arisen due to the relatively complex curves of the surfaces of the molded plastics. Attempts have been made to eliminate the marking problems by utilizing conventional printing techniques to first apply the desired marking on flat sheets, which are subsequently bonded on the surface of the plastics product. These attempts have, however, been relatively unsuccessful, since where the printed sheet is applied to the surface of the plastics article after formation thereof, the handling required raises production costs, particularly since such method cannot be performed in a single step.

Yet, attempts to bond the printed sheet to the product during the molding, which would permit a single step operation, have proven unsuccessful since the sheets became distorted during their application to the plastics product.

In order to overcome these drawbacks a method has been finally proposed, according to which the desired markings are formed on a flat, relatively flexible porous sheet material matrix, which is positioned in the mold in which the article is to be formed. Then the plastic parison is introduced in the mold and a vacuum is provided on the side of the matrix remote from the parison and molding the latter, whereby the surface of the expanding parison adjacent the matrix will have formed thereon the markings of the matrix free of any blemishes.

While this method amounted to an appreciable advance over the previous methods, the manufacture of the article is extremely slowed up because individual matrices are inserted into the open mold.

It is, therefore, one object of the present invention to provide a method of applying members, as labels, platens, or the like to hollow bodies in a blowing process, wherein the drawbacks of the known structures are avoided.

It is another object of the present invention to provide a method of applying members, as labels, platens or the like, wherein a paper of predetermined size having a layer is fed by means of a particular feeding device into the hollow mold from the side of the clamping plate of the mold by a stamp. The stamp forms then with the layer carrying paper one part of the mold.

The possibility exists thereby to use the feeding stamp, simultaneously as a cutting stamp and to stamp out corresponding sections from a leaf band or a paper band having a layer of plastic material or glueable material and to feed these sections into the blowing mold. In this case uneven and curved faces can be inserted upon application of expandible leaves, while in the case of paper only the possibility of deforming of the paper by vacuum exists.

With these and other objects in view, which will become apparent in the following detailed description, the present invention will be clearly understood in connection with the accompanying drawing, in which:

FIGS. 1 and 2 are axial sections of a blow mold and FIG. 2 in particular in open position and FIG. 1 in blowing or closing position.

Referring now to the drawing, and in particular to FIGS. 1 and 2, which disclose sections taken at a right angle to the division of a mold and a squeezing edge 17 of a form half 11 and parallel to the axis of a hose 16 which is squeezed out through a nozzle 10. The form half 11 is equipped with an opening 21, which has a cross-section exactly identical with that of a stamp 19, so that the edge 23 of the stamp 19 forms jointly with the edge 24 of the form half 11 a punching tool. Between the two cutting edges 23 and 24, the leaf or the layer carrying paper 15 is inserted. During the closing movement, the stamp 19, which is equipped with vacuum nozzles 22, is moved onto the hollow chamber 13. By this arrangement, a platen 25 (FIG. 1) is stamped out from the leaf 15 and the layer carrying paper, respectively, by means of the cutting edges 20 and 21, which platen 25 assumes, due to the concavely curved end face of the stamp 19, the form of the inner face of the wall of the bottle-shaped like chamber 13 and is sucked up towards the stamp 19 by means of the vacuum nozzles 22.

Upon completion of the closing process, the stamp 19 forms one part of the mold wall. Depending upon the length of movement of the stamp 19, the platen of thermoplastic material or of a layer carrying paper can be disposed indented and merely complementary relative to the inner wall face of the chamber 13, as shown in FIG. 1. Upon termination of the blowing step, the stamp 19 is returned to its original position. During this step, the cut-off strip of the leaf 15 is taken off by means of a stripping ring 20 from the stamp 19, so that the leaf or the layer carrying paper 15 can now be advanced into the next operative position.

The conveying device for the leaf 15 can be of a structure similar to that used in the sheet metal industry and in printing plants, respectively, and this conveying device is not subject matter of the present invention. It is also possible to insert already pre-stamped platens instead of cutting them during the insertion step and to insert the same into the hollow body in the manner described above.

While I have disclosed one embodiment of the present invention, it is to be understood that this embodiment is given by example only and not in a limiting sense, the scope of the present invention being determined by the objects and the claims.

I claim:

1. A method of applying labels to a blow molded plastic article during the molding of said article in a hollow mold containing at least two parts, said method comprising the steps of extruding a plastic hose in a hollow mold, feeding a printed leaf of thermoplastic material past said hollow mold, cutting at least a portion of said printed leaf of thermoplastic material and engaging said portion of said printed leaf of thermoplastic material with the outer surface of said extruded plastic hose, blow molding the latter and simultaneously permanently securing said portion of said printed leaf of thermoplastic material to said blow molded article, advancing said printed leaf of thermoplastic material for a following blow molding operation, and said step of cutting of at least a portion of said material being performed by a member feeding said portion of said printed leaf of thermoplastic material into said mold through a cavity in the wall of said mold, and said cavity being complementary to said feeding member.

2. The method, as set forth in claim 7, which includes the steps of feeding said portion of said sheet of label material into said mold by retaining said portion on said member.

No references cited.

ROBERT F. WHITE, *Primary Examiner.*

ALFRED L. LEAVITT, *Examiner.*

A. R. NOE, *Assistant Examiner.*